United States Patent
Bressan et al.

(10) Patent No.: US 7,826,665 B2
(45) Date of Patent: Nov. 2, 2010

(54) PERSONAL INFORMATION RETRIEVAL USING KNOWLEDGE BASES FOR OPTICAL CHARACTER RECOGNITION CORRECTION

(75) Inventors: Marco Bressan, La Tronche (FR); Hervé Dejean, Grenoble (FR); Christopher R. Dance, Meylan (FR)

(73) Assignee: Xerox Corporation, Norwalk, CT (US)

( * ) Notice: Subject to any disclaimer, the term of this patent is extended or adjusted under 35 U.S.C. 154(b) by 1254 days.

(21) Appl. No.: 11/299,453

(22) Filed: Dec. 12, 2005

(65) Prior Publication Data

US 2007/0133874 A1    Jun. 14, 2007

(51) Int. Cl.
*G06K 9/00* (2006.01)

(52) U.S. Cl. .................. 382/181; 382/186; 382/187

(58) Field of Classification Search .................. 382/181, 382/231
See application file for complete search history.

(56) References Cited

U.S. PATENT DOCUMENTS

| | | | |
|---|---|---|---|
| 5,483,052 A | 1/1996 | Smith, III et al. | |
| 5,604,640 A | 2/1997 | Zipf et al. | |
| 5,754,671 A * | 5/1998 | Higgins et al. | 382/101 |
| 5,850,480 A | 12/1998 | Scanlon | |
| 6,783,060 B2 | 8/2004 | Marappan | |
| 6,823,084 B2 | 11/2004 | Myers et al. | |
| 7,120,302 B1 * | 10/2006 | Billester | 382/229 |
| 2001/0044324 A1 | 11/2001 | Carayiannis et al. | |
| 2002/0131636 A1 * | 9/2002 | Hou | 382/181 |
| 2002/0191847 A1 | 12/2002 | Newman et al. | |
| 2003/0069877 A1 | 4/2003 | Grefenstette et al. | |
| 2003/0086615 A1 | 5/2003 | Dance et al. | |
| 2005/0086205 A1 | 4/2005 | Franciosa et al. | |
| 2005/0086224 A1 | 4/2005 | Franciosa et al. | |

FOREIGN PATENT DOCUMENTS

| | | |
|---|---|---|
| DE | 10104270 | 8/2002 |
| GB | 2392290 | 2/2004 |

OTHER PUBLICATIONS

Kilgarriff et al., "Introduction to the Special Issue on the Web as Corpus," Computational Linguistics, vol. 29, No. 3, pp. 333-347, (2003).

Handley et al., "Document Understanding System Using Stochastic Context-Free Grammars," pp. 5.

(Continued)

*Primary Examiner*—Samir A. Ahmed
*Assistant Examiner*—Edward Park
(74) *Attorney, Agent, or Firm*—Fay Sharpe LLP

(57) ABSTRACT

In a system for updating a contacts database (42, 46), a portable imager (12) acquires a digital business card image (10). An image segmenter (16) extracts text image segments from the digital business card image. An optical character recognizer (OCR) (26) generates one or more textual content candidates for each text image segment. A scoring processor (36) scores each textual content candidate based on results of database queries respective to the textual content candidates. A content selector (38) selects a textual content candidate for each text image segment based at least on the assigned scores. An interface (50) is configured to update the contacts list based on the selected textual content candidates.

15 Claims, 3 Drawing Sheets

OTHER PUBLICATIONS

Strohmaier et al., "Lexical Postcorrection of OCR-Results: The web as a Dynamic Secondary Dictionary?," pp. 5.

Martins et al., "Spelling Correction for Search Engine Queries," pp. 12.

Xerox, "Xerox Document Imaging Technology Changes the Way People Communicate," Public Relations Department, France, pp. 2, (2004).

Katsuyama et al., "Highy Accurate Retrieval of Japanese Document Images Through a Combination . . . ," Proc SPIE vol. 2670, pp. 57-67, (2002).

Saiga et al., "An OCR System for Business Cards," IEEE Comput. Soc., pp. 802-805, 1993.

Likforman-Sulem et al., "Proper Names Extraction from Fax Images Combining Textual and Image Features," IEEE, pp. 545-549, 2003.

Luo et al., "Design and implementation of a card reader based on build-in camera," IEEE, vol. 1, pp. 417-420, 2004.

* cited by examiner

John H. Smith

Process Engineer

ABC Widget Corporation
12345 Main Street
New York, NY 11111

PERSONAL INFORMATION RETRIEVAL USING KNOWLEDGE BASES FOR OPTICAL CHARACTER RECOGNITION CORRECTION

CROSS REFERENCE TO RELATED PATENTS AND APPLICATIONS

The following U.S. patent applications, relating generally at least to aspects of capturing text images and to processing of digitally captured text, are commonly assigned with the present application, and are incorporated herein by reference:

Dance et al., "Method and Apparatus for Capturing Text Images," U.S. patent application Ser. No. 09/985,433 filed 2 Nov. 2001 and published as US 2003/0086615 A1, is incorporated by reference herein in its entirety.

Newman et al., "Portable Text Capturing Method and Device Therefor," U.S. patent application Ser. No. 10/214,291 filed 8 Aug. 2002 and published as US 2002/0191847 A1, is incorporated by reference herein in its entirety.

The following U.S. patent application, relating generally at least to aspects of using knowledge bases for augmenting information, is commonly assigned with the present application, and is incorporated herein by reference:

Grefenstette et al., "System for Automatically Generating Queries," U.S. patent application Ser. No. 09/683,235 filed 5 Dec. 2001 and published as US 2003/0069877 A1, is incorporated by reference herein in its entirety.

The following U.S. patent applications, relating generally at least to aspects of document retrieval, are commonly assigned with the present application, and are incorporated herein by reference:

Franciosa et al., "System and Method for Computing a Measure of Similarity between Documents," U.S. patent application Ser. No. 10/605,631 filed 15 Oct. 2003 and published as US 2005/0086224 A1, is incorporated by reference herein in its entirety.

Franciosa et al., "System and Method for Performing Electronic Information Retrieval Using Keywords," U.S. patent application Ser. No. 10/605,630 filed 15 Oct. 2003 and published as US 2005/0086205 A1, is incorporated by reference herein in its entirety.

BACKGROUND

The following relates to the information arts. It especially relates to methods and apparatuses for extracting textual personal information from business cards photographed using the built-in camera of a cellular telephone, and will be described with particular reference thereto. The following relates more generally to extraction of textual personal information from images acquired by portable imagers such as digital cameras, handheld scanners, and so forth, and to acquiring personal information by using a portable imager in conjunction with text extraction techniques, and so forth.

The cellular telephone including built-in digital camera is a common device carried by business and professional persons. While having a wide range of uses, one application to which the digital camera component of cellular telephones is applied is the rapid capture of business card images. When meeting someone for the first time, or when meeting someone whose personal information has changed due to a job transfer, promotion, or so forth, it is convenient for the business or professional person to use the built-in camera of his or her cellular telephone to photograph the business card of the newly met person, thus creating a digital image of the business card. In effect, the built-in digital camera of the cellular telephone is used as a kind of portable instant document scanner. However, the photograph is in an image format, such that the textual content is not immediately accessible for input to a text-based personal contacts list or other text-based database.

Optical character recognition (OCR) software extracts textual information from images. Thus, a desirable combination is to apply OCR to extract textual information from the business card image acquired using the built-in digital camera of the cellular telephone. Once text is extracted, each text line can optionally be tagged as to data type (such as tagging text lines as "personal name", "job title", "entity affiliation", or so forth), and optionally incorporated into a contacts database. In practice, however, it has been found to be difficult to effectively apply OCR to business card images acquired using digital cameras.

One problem which arises is that the resolution of the built-in digital cameras of cellular telephones is typically low. The built-in cameras of existing cellular telephones sometimes have a so-called VGA resolution corresponding to the coarse pixel density of a typical display monitor. Some existing cellular telephones have built-in cameras with higher resolution, such as around 1-2 megapixels or more. It is anticipated that the built-in camera resolution will increase as cost-per-pixel decreases. However, even with improved pixel resolution, image quality is likely to be limited by poor optics. Higher manufacturing costs of the physical optical system as compared with electronics has tended to cause manufacturers to use optics of limited quality. Lens quality is improving at a substantially slower rate than resolution, and so this aspect of typical cellphone cameras is less likely to improve substantially in the near future. Further, the trend toward more compact or thinner cellular telephones calls for miniaturized optics, which are difficult to manufacture with high optical quality. Common adverse effects of poor lenses include image noise, aberrations, artifacts and blurring. OCR tends to produce more errors and higher uncertainty under these conditions.

Additionally, the cellular telephone is held by hand, focused on the small business card, during imaging of the business card. Accordingly, unsteadiness of the camera during the photographing can produce blurring, artifacts, or other image degradation. Image acquisition is typically done in uncontrolled conditions, such as variable lighting, strong shadows, non-expert usage, variable distance to objective, variable three-dimensional viewing angle, and so forth. The acquired document image orientation often has substantial scale, skew, and/or rotation components, and may have substantial variation in illumination. In summary, the physical characteristics of the camera, non-ideal imaging environment, and the typically limited photographic skill of the operator combine such that a built-in digital camera of a cellular telephone typically acquires business card images of relatively quality with substantial image defects, which tends to lead to substantial errors and uncertainty in the OCR.

The textual content of the business card also does not lend itself to accurate OCR. In typical OCR processing, objects are recognized and identified as letters, numerals, punctuation, or other characters based on pattern matching, but with some uncertainty because the rendering of the characters is less than optimal, because the text font may vary, and so forth. To counter these difficulties, OCR processing sometimes resolve uncertainties by comparing uncertain words or phrases against an electronic dictionary or grammar checker. These approaches are relatively ineffective when applied to OCR conversion of the textual content of business cards, because the content (such as personal names, job titles, affiliations, addresses, and so forth) are typically not found in electronic dictionaries and typically do not follow conventional grammar rules. Thus, the nature of the textual content tends to lead to unresolvable errors and uncertainty in the OCR.

BRIEF DESCRIPTION

According to aspects illustrated herein, there is provided a system for updating a contacts database. A portable imager is configured to acquire a digital business card image. An image segmenter is configured to extract text image segments from the digital business card image. An optical character recognizer (OCR) is configured to generate one or more textual content candidates for each text image segment. A scoring processor is configured to score textual content candidates based on results of database queries respective to the textual content candidates. A content selector selects a textual content candidate for each text image segment based at least on the assigned scores. An interface is configured to update the contacts database based on the selected textual content candidates.

According to aspects illustrated herein, there is provided a method for acquiring personal information. A business card image is acquired. A text image segment is extracted from the business card image. Optical character recognition (OCR) is applied to the text image segment to generate a plurality of textual content candidates. At least one database is queried respective to each of the textual content candidates. A most likely one of the textual content candidates is selected based at least on records returned by the querying.

According to aspects illustrated herein, there is provided a system for generating a textual contact record from textual content candidates extracted by optical character recognition (OCR) from text image segments of a business card image. A databases query queries at least one database respective to the textual content candidates and collects records returned responsive to the queries. A content candidates scoring processor assigns scores to the textual content candidates based on the collected records. A content selector selects a textual content candidate for each text image segment based at least on the assigned scores.

DETAILED DESCRIPTION

Figure 1:
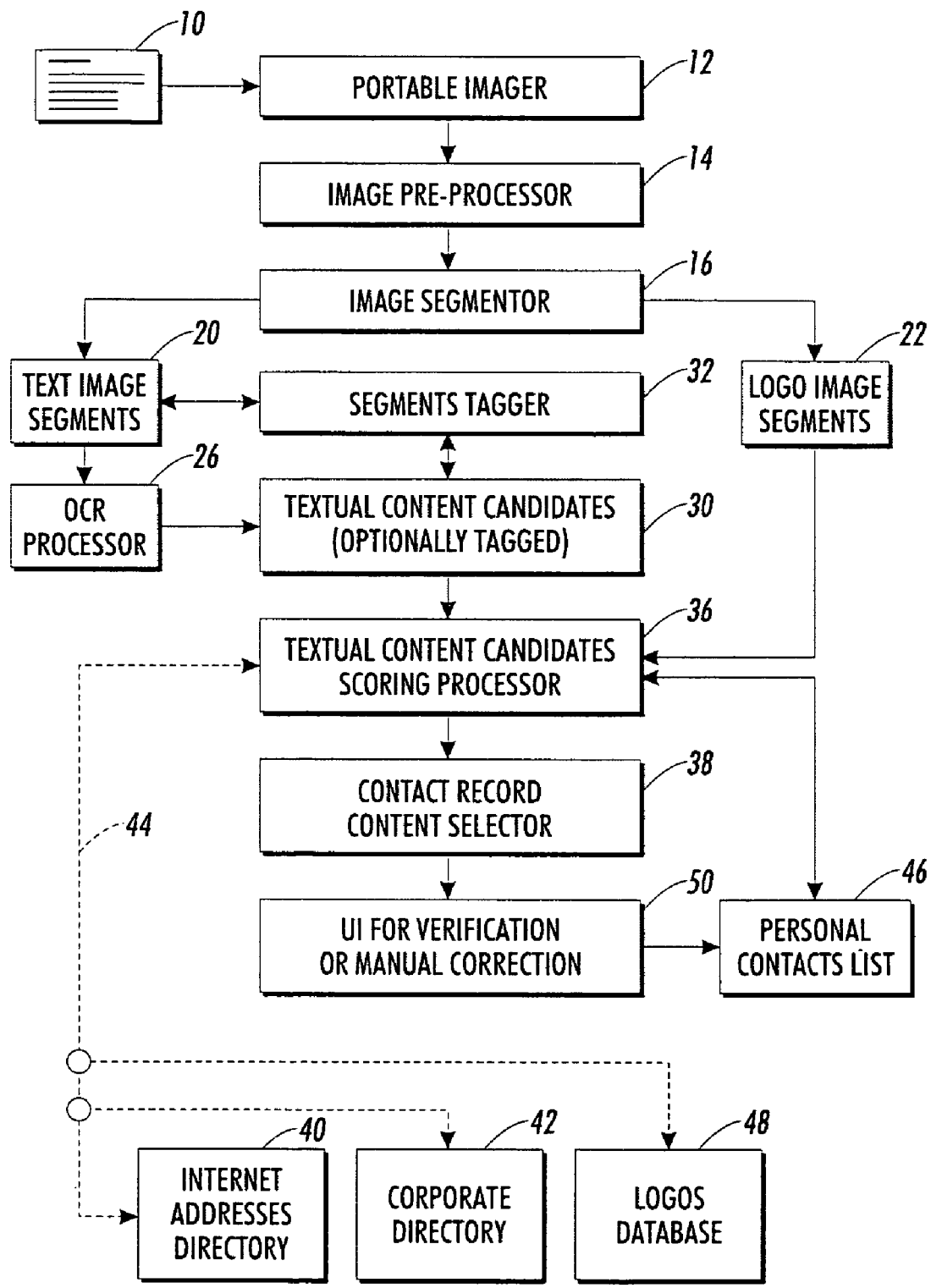
FIG. 1 diagrammatically shows a system for acquiring a business card image and processing the business card image to construct a contact record.

With reference to FIG. 1, a business or professional person or other person receives a business card 10, which he or she wants to add to a contacts database, contact list, or so forth. Accordingly, the person acquires an image of the business card 10 using a portable imager 12, which may for example be a built-in camera of a cellular telephone, a portable digital camera, a handheld document scanner, or so forth. Using the built-in camera of a cellular telephone as the portable imager 12 has advantages in that the cellular telephone is a portable device commonly carried by business and professional persons into meetings and other interpersonal transactional settings. Using the built-in camera of a cellular telephone or a point-and-shoot-type digital camera advantageously allows the business card image to be acquired at the click of a shutter button. However, it is also contemplated to acquire the image using a portable scanner or other scan-based portable imager.

In the illustrated embodiment, the business card 10 is a physical card, such as a 2×3½-inch business card or similar-sized business card that is commonly carried by business and professional persons. However, the term "business card" is intended to encompass other printed personal information summaries which may be advantageously digitally imaged by a portable imager and processed to extract textual personal information for inclusion in a contacts database. For example, the term "business card" as used herein may also encompass presenter information appearing on the title slide of a printed copy of an overhead presentation, or author information appearing on the first page of a scientific or technical article pre-print, or so forth. The personal information content of business cards typically include personal name, job title, affiliation (such as a company name, university name, firm name, or so forth), graphical affiliation logo (such as a corporate logo, university logo, firm logo, or so forth), business address information, business telephone number, business facsimile number, email address, or so forth. A given business card may include only some of these items or all of these items, and may include additional or other information.

Optionally, an image pre-processor 14 performs selected image pre-processing on the acquired business card image. Such pre-processing may include, for example, squaring of the image, re-sizing the image, performing a blurring correction, shadow correction, reflection correction, or other correction, converting the business card image to black-and-white, performing image compression, or so forth. In some embodiments, the image pre-processor 14 is embodied by Mobile Document Imaging software (available from Xerox Corporation, Xerox Research Centre Europe, Grenoble, France) disposed on and executing on the cellular telephone or other portable imager 12. In other embodiments, the image pre-processor may be other pre-processing software disposed on and executing on the portable imager 12. In other embodiments, the image pre-processor 14 may execute on a network server, personal computer, or other computer, in which case the image pre-processor 14 receives the business card image from the cellular telephone or other portable imager 12 by a suitable wired or wireless communication path such as a Bluetooth link, a mobile telephone network link, or so forth.

Figure 2:
FIG. 2 shows a typical example business card including personal name, title, business affiliation, business address, and a corporate logo.

With continuing reference to FIG. 1 and with further reference to FIG. 2, the acquired and optionally pre-processed business card image is segmented by an image segmenter 16 to extract text image segments 20 and optional logo image segments 22. Each of the text image segments 20 suitably corresponds to a dot-matrix representation of a line of text in the business card image. For the example business card of FIG. 2, the text image segments 20 may include the following five text image segments: "John H. Smith", "Process Engineer", "ABC Widget Corporation", "12345 Main Street", and "New York, N.Y. 11111". The text image segments retain the font characteristics such as kerning, since the text image segments are not character-based. In this example, the text image segments correspond to physical lines of text. However, depending upon the layout of the business card and the segmenting algorithm implemented by the image segmenter 16, the text image segments may in some embodiments correspond to units other than physical lines of text.

Similarly, the image segmenter 16 optionally also extracts logo image segments 22. For the example business card of FIG. 2, the logo image segments 22 may include the single logo shown at the left side of the business card, showing the company name "ABC" with the A inscribed into a left-slanted "W" indicative of the widget products of ABC Widget Corporation.

An optical character recognizer (OCR) 26 processes each of the text image segments 20 to generate character-based textual content candidates 30. The OCR operates based on a pattern recognition algorithm or algorithms which identify characters based on matching with expected character shapes. Errors or uncertainty in the output of the OCR processing can be expected to occur due to various factors, such as: less than ideal match between a printed character and the expected pattern; non-optimal image quality (in spite of improvements provided by the image pre-processor 14); short or usual textual content such as names and addresses; difficult-to-match fonts having substantial flourishes or other artistic features; and so forth. Accordingly, the OCR 26 outputs one or (if uncertainty exists) more than one character-based textual content candidate for each text image segment. For example, OCR processing of the text image segment: "John H. Smith" may produce several different textual content candidates, such as: "John N. Smith", Yohn H. Smith", "John H. Smith", and so forth.

To resolve uncertainties, the OCR 26 optionally utilizes additional information or post-conversion processing such as a spelling checker, a grammar checker, or so forth. However, because the content of business cards typically includes personal names, addresses, and so forth that are not commonly found in dictionaries, and because the content of business cards is typically not laid out in grammatically proper form, attempts to resolve uncertainties using dictionaries or grammar checkers are unlikely to be effective for the present application.

In some embodiments, the OCR 26 assigns a confidence level to each textual content candidate based on the closeness of the pattern match and optionally based on other information such as whether the textual content candidate (or words within the textual content candidate) match a term found in a dictionary. Again, because of the non-standard content, fonts, and text layout of typical business cards, the confidence levels assigned to the textual content candidates by the OCR 26 may be more suspect than in other typical OCR applications.

Optionally, a segments tagger 32 attempts to tag the text image segments 20 with an indication of the type of content each text image segment conveys. For example, suitable tags for business card content may include "personal name", "job title", "entity" (a suitable tag for an affiliation such as a corporation, university, or the like), "address line", or so forth. The segments tagger 26 can use various pieces of information in assigning tags to the text image segments 20. For example, the first line and/or the line with the largest font size is often the name of the person whose information is conveyed by the card. Hence, the position and large font size of the text image segment: "John H. Smith" may enable the tagger 32 to tag this text image segment as a personal name. The relative font size is suitably derived from the text image segment 20. Address information often starts with numerals—hence, the text image segment: "12345 Main Street" may be tagged as the first line of an address by the tagger 32. Recognition that text begins with numeric characters is suitably derived from the character-based textual content candidates 30. The tagger 32 may in general operate on the text image segments 20, the textual content candidates 30, or both. As with the OCR processing, it will be appreciated that tags optionally assigned by the segments tagger 32 will typically have a certain degree of uncertainty.

In view of the certainty and limited accuracy of the OCR and tagging, the textual content candidates 30 and assigned tags typically have a degree of uncertainty. In order to select from amongst two or more textual content candidates corresponding to a single text image segment (for example, to select from amongst "John N. Smith", Yohn H. Smith", "John H. Smith", and so forth for the text image segment "John H. Smith"), a textual content candidates scoring processor 36 assigns a score to each textual content candidate. The score assigned to each textual content candidate reflects a weight, probability, or other indicator of likelihood of correctness of the textual content candidate. A contact record content selector 38 selects the textual content candidate for each text image segment for inclusion in the contact record based at least on the assigned scores. The textual content candidates scoring processor 36 assigns the score to each textual content candidate on the basis of records collected from queries against at least one database respective to the textual content candidates.

FIG. 1 diagrammatically illustrates some suitable databases for querying by the textual content candidates scoring processor 36, such as an Internet address book or directory 40 or a corporate directory 42, both of which are accessible via a network pathway 44, or a personal contacts list 46, which may reside on the portable imager 12 (for example as a cellular telephone contacts list) or on the business or professional person's personal computer. In the latter case, the person identified by the business card 10 may be known to the person acquiring the personal information, but the business card 10 may include updated affiliation information (for example, if the person identified by the business card 10 has recently changed jobs), updated position (for example, if the person identified by the business card 10 has recently been promoted), or so forth.

The database queries provide information as to whether a textual content candidate is reasonable. For the example text image segment: "John H. Smith", queries respective to the textual content candidates "John N. Smith", "Yohn H. Smith", "John H. Smith" should readily eliminate at least "Yohn H. Smith" since this candidate will produce few or no hits. Moreover, the collected records may be useful to update the tagging information. For example, if a collected record includes "John H. Smith" tagged as a personal name, this can be used to bias the tagging of the text image segment: "John H. Smith" toward being tagged as a personal name. In some embodiments, the optionally extracted logo segment tags 22 are also queried against a logos database 48. The logo query may return metadata pertaining to the logo. For the example business card of FIG. 2, a logo query on the logo shown at the left side of the business card may return entity identification metadata associating the logo with the ABC Widget Corporation. This, in turn, can be used to select "ABC Widget Corporation" from amongst other possible textual content candidates for the text image segment "ABC Widget Corporation".

The contact record content selector 38 selects a most likely textual content candidate for each text image segment for inclusion in the contact record. The contact record is suitably stored in a contacts database such as the corporate directory 42, the personal contacts list 46, both contacts databases 42, 46, or so forth. Optionally, a user interface 50 is provided to enable the acquiring person to review and optionally edit the constructed contact record for the person whose information is conveyed by the business card 10 prior to storage in one or more contacts databases 42, 46.

As noted previously, the image pre-processor 14 may reside either on the portable imager 12 (for example as a software application on a cellular telephone having a built-in camera), or may reside on a network server, personal computer, or so forth. In similar fashion, the image segmenter 16, OCR processor 26, segments tagger 32, scoring processor 36, contact record content selector 38, and user interface 50 may be variously distributed. In some embodiments, the processing components 14, 16, 26, 32, 36, 38, 50 all reside on the portable imager 12. In these embodiments, the network pathway 44 suitably includes a wireless mobile telephone connection, a wireless connection to an Internet hotspot, or other wireless portion. In some embodiments, some or all of the processing components 14, 16, 26, 32, 36, 38, 50 reside on a network server, personal computer, or the like. Data is transferred at the appropriate point in processing from the portable imager 12 to the network server, personal computer, or so forth. In these embodiments, the network pathway 44 may included wired or wireless components as is suitable for the network server, personal computer, or so forth performing the processing. As just one example of one of these latter embodiments, the image pre-processor 14 and image segmenter 16 may reside on the portable imager 12 as cellular telephone-based software, and the text image segments 20 and optional logo image segments 22 output by the cellphone-based image segmenter 16 are transferred to a corporate network (such as to a network server) for OCR and further processing. Once the contact record is generated on the network, it may be stored in the corporate directory 42, and/or may be sent back to the portable imager 12 for storage in the personal contacts list 46 residing on the portable imager 12 as a cellular telephone contacts list.

Figure 3:
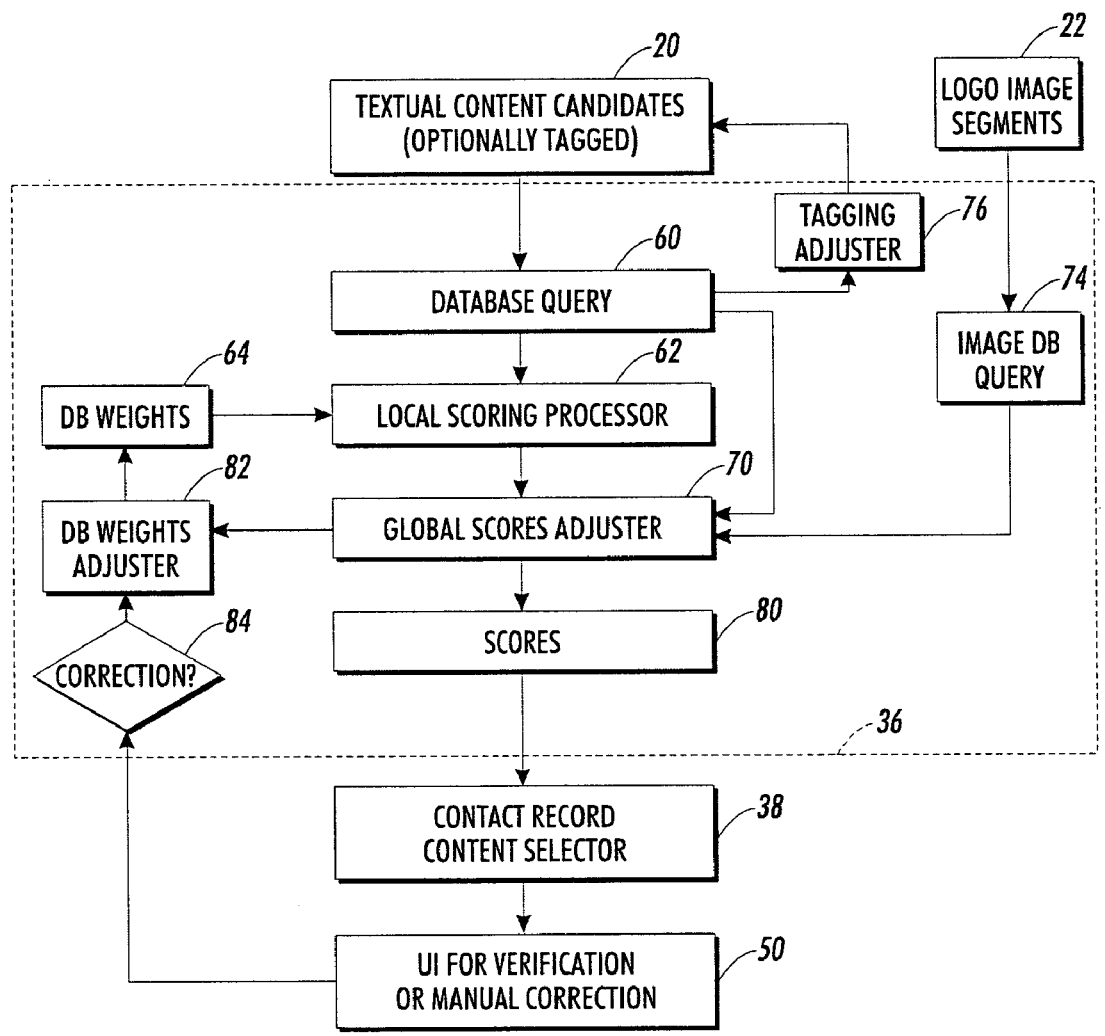
FIG. 3 diagrammatically shows principal components of the textual content candidates scoring processor of the system of FIG. 1.

With continuing reference to FIG. 1 and with further reference to FIG. 3, some illustrative example embodiments of the textual content candidates scoring processor 36 are described. A databases query 60 queries one or more databases 40, 42, 46 respective to each of the textual content candidates 20, and collects records returned responsive to the query. A local scoring processor 62 computes a score for each textual content candidate based on records returned by the query respective to that textual content candidate. If only a single database is queried, then one suitable local score for textual content candidate p may be a total of the number of records or hits returned by the query. If more than one database is queried, then one suitable local score for textual content candidate p may be:

$$\text{localscore}(p) = \sum_{k \subset databases} \text{score}_k(p) \cdot w_k, \quad (1)$$

where k indexes the queried databases, $\text{score}_k(p)$ indicates the score for each database (for example, $\text{score}_k(p)$ is in some embodiments suitably computed as the number of records or hits collected from database k for the query respective to the textual content candidate p), and $w_k$ indicates a reliability weight assigned to the database k from a set of database weights 64. The reliability weight $w_k$ is indicative of the reliability of the database k in supporting correct textual content candidates and in not supporting incorrect textual content candidates. In some embodiments, the database weights $w_k$ are omitted, and each database is given equal weight in determining the local score.

In some embodiments, the user may be able to select which databases are to be queried. For example, if the user knows that the business card image relates to a fellow employee at the user's employing corporation, then the queries performed by the databases query 60 are optionally limited to the corresponding corporate database. On the other hand, if the user acquired the business card image at a conference from someone outside of the employing corporation, then the queries performed by the databases query 60 are suitably expanded to encompass other databases such as the Internet addresses directory 40.

In some embodiments, the local score of Equation (1) is suitably used as the score for selecting which of two or more textual content candidates is the correct extracted text for a corresponding text image segment. However, while computationally straightforward, this exclusively localized approach may fail to take advantage of interrelationships between the various text image segments 20. To take the business card of FIG. 2 as an example, the name "John Smith" is common in the United States—accordingly, database queries may collect a large number of records for both the correct "John H. Smith" textual content candidate, and also for the incorrect "John N. Smith" textual content candidate. Thus, an exclusively localized approach may be unable to accurately distinguish the correct "John H. Smith" over the incorrect "John N. Smith." This ambiguity may be resolvable by taking into account records collected for queries on the text image segment "ABC Widget Corporation". Collected records for the correct textual content candidate "ABC Widget Corporation" are likely to include records that also contain "John H. Smith" since he is an employee of ABC Widget Corporation, and are much less likely to include records that also contain "John N. Smith", assuming that ABC Widget Corporation does not have any employees by that name.

Thus, in some embodiments a global adjuster 70 modifies the score of a first textual content candidate corresponding to a first text image segment when at least one record returned by a query respective to another textual content candidate corresponding to another text image segment also includes the first textual content candidate. More generally, the global adjuster 70 is configured to selectively adjust scores of textual content candidates based on results of database queries respective to other textual content candidates. In one suitable embodiment, the global adjuster 70 implements the following score adjustment:

$$\text{score}(p) = \text{localscore}(p) \cdot \sum_{r \subset records} f(r, p) \quad (2)$$

where $$f(r, p) = \frac{\sum_{p \subset different\ text\ image\ segments} \text{match}(r, p)}{|\text{text image segments}|},$$

where match(r,p)=1 if record r includes textual content candidate p and match(r,p)=0 otherwise, and text image segments equals the total number of text image segments 20 that are queried by the databases query 60. If a textual content candidate is matched by a record which matches textual content candidates of other text image segments, its score is increased. If a textual content candidate is matched by a record which also matches a textual content candidate of every one of the other text image segments of the business card image, then the reinforcement provided by the global adjuster 70 of Equation (2) is maximal. On the other hand, if a textual content candidate is matched by a record which does not match any other textual content candidate of the business card image, then the reinforcement provided by the global adjuster 70 of Equation (2) is minimal. Optionally, the reinforcement coefficient is normalized over the records.

Optionally, the global adjuster 70 also selectively adjusts the local scores based on metadata returned by an image databases query 74 performed respective to the logo image segments 22. Databases containing logo images are queried and textual metadata associated with the logo image segments 22 can be used to adjust the scores. The textual metadata may include, for example, company name, company address, and so forth.

In some embodiments, the results of the database queries 60 are also used to adjust the tags of the text image segments 20. For example, a tagging adjuster 76 can adjust a tag that had been previously assigned to a text image segment by the segments tagger 32 based on tagging of portions of collected records that correspond to the textual content candidate. Referring to the business card of FIG. 2, for example, if the segments tagger 32 initially incorrectly tagged the text image segment "Process Engineer" as an employment affiliation, but records containing "John H. Smith" also contain the text "Process Engineer" tagged as a job title or occupation, then these record tags can be used by the tagging adjuster 76 to suitably correct the tagging of the text image segment "Process Engineer".

The resulting scores 80 are suitably used by the contact record content selector 38, optionally along with other information such as OCR confidence level values, to select a most likely textual content candidate for each text image segment for inclusion in the record corresponding to the business card 10.

With continuing reference to FIG. 3, in some embodiments the set of database weights 64 are adjusted automatically by a database weights adjuster 82. For example, whenever the user corrects an erroneous selection of a textual content candidate via the user interface 50, a correction flag 84 is set which triggers the database weights adjuster 82 to relatively lower the weight $w_k$ of the database k that erroneously supported the erroneous selection. (Typically, the weights $w_k$ are normalized, so relatively lowering one weight $w_k$ calls for relatively raising the weights of the other databases. Similarly, if the user replaces an incorrect textual content candidate with a correct textual content candidate that had been supported by another database k', then the corresponding weight $w_{k'}$ is suitably relatively increased. Such ongoing adjustment of the database weights 64 based on accuracy of support for textual content candidates enables the system to lower the importance of databases that generally do not provide correct support for textual content candidates, and to raise the importance of databases that generally do provide correct support for textual content candidates.

In some embodiments, the scores output by the textual content candidates scoring processor 36 may be the sole basis on which the contact record content selector 38 makes the selection of the most likely textual content candidates.

In other embodiments, the contact record content selector 38 may use the scores in conjunction with other information or criteria in selecting the most likely textual content candidates. In some such embodiments, the score calculation is optionally configured such that if no database query hits are returned, then the effect of the score is null. For example, in one approach the OCR processor 26 returns a confidence level for each textual content candidate based on criteria such as the closeness of character matching, whether the textual content candidate or portions thereof were found in an electronic dictionary, or so forth. A high score assigned by the textual content candidates processor 36 for a particular textual content candidate is then used to increase the confidence level assigned by the OCR processor 26, while a low assigned score may be suitably ignored. This can be accomplished, for example, by adding the score assigned by the textual content candidates processor 36 to a particular textual content candidate to the confidence level value of that textual content candidate assigned by the OCR processor 26. In some embodiments, if no hits are returned for a textual content candidate determined to be most likely correct based on OCR confidence level or other criteria, then a warning may be issued to the user via the user interface 50, since the failure to find any hits in the databases may suggest that the selection of the textual content candidate is in error.

The databases query-based scoring techniques described with reference to FIG. 3 and Equations (1) and (2) are illustrative examples. The skilled artisan can readily construct other scoring algorithms for assigning scores indicative of likelihood of correctness to textual content candidates. In general, the scoring should typically increase the likelihood of selecting textual content candidates that appear frequently in databases, and optionally should also typically increase the likelihood of selecting a tag for a text image segment that matches the tag given to likely textual content candidates corresponding to that text image segment. Optionally, the scoring is constructed to selectively increase the likelihood of correctness of textual content candidates of different text image segments that are found together in the same record, since this enables the scoring to advantageously take into account typical interrelatedness of the different text image segments. Optionally, the assigned scores are combined with OCR confidence levels or other measures of likelihood of correctness in selecting the most likely textual content candidate for each text image segment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for updating a contacts database, the system comprising:
   a portable imager configured to acquire a digital business card image;
   an image segmenter configured to extract text image segments from the digital business card image;
   an optical character recognizer (OCR) configured to generate one or more textual content candidates for each text image segment;
   a scoring processor configured to assign scores to two or more textual content candidates generated by the OCR for an ambiguous text image segment based on results of database queries respective to the two or more textual content candidates, wherein the scoring processor comprises:
      a local scoring processor component configured to compute a score for each of the two or more textual content candidates based on results of database queries respective to that textual content candidate; and
      a global scores adjustment component configured to selectively adjust scores of two or more textual content candidates based on results of database queries respective to textual content candidates generated by the OCR for text image segments other than the ambiguous text image segment;
   a content selector that selects one of the two or more textual content candidates based at least on the assigned scores; and an interface configured to update the contacts database based on the selected one of the two or more textual content candidates.

2. The system as set forth in claim 1 wherein the portable imager includes a cellular telephone including a built-in camera.

3. The system as set forth in claim 1, wherein the portable imager includes a built-in camera of a cellular telephone including a built-in camera.

4. The system as set forth in claim 1, further comprising:
a computer embodying at least the OCR and scoring processor, the computer being physically distinct from the portable imager.

5. The system as set forth in claim 1, wherein at least the image segmenter, OCR, and scoring processor reside on the portable imager.

6. The system as set forth in claim 1, wherein the interface comprises:
a user interface configured to allow an associated user to accept or edit the selected one of the two or more textual content candidates prior to updating the contacts database.

7. A method for acquiring personal information, the method comprising:
acquiring a business card image wherein the acquiring of the business card image comprises photographing the business card using a built in camera of a cellular telephone;
extracting text image segments including an ambiguous text image segment from the business card image;
applying optical character recognition (OCR) to the text image segments including the ambiguous text image segment to generate textual content candidates for the text image segments including two or more textual content candidates for the ambiguous text image segment;
querying at least one database respective to each of the textual content candidates;
assigning scores to the two or more textual content candidates generated by the OCR for the ambiguous text image segment by:
computing a score for each of the two or more textual content candidates generated by the OCR for the ambiguous text image segment based on results of database queries respective to that textual content candidate; and
performing a global adjustment of the scores of the two or more textual content candidates generated by the OCR for the ambiguous text image segment based on results of database queries respective to textual content candidates generated by the OCR for text image segments other than the ambiguous text image segment;
selecting a most likely one of the two or more textual content candidates generated by the OCR for the ambiguous text image segment based at least on the assigned scores;
wherein the extracting, applying, querying, assigning, and selecting are performed by a processor.

8. The method as set forth in claim 7, wherein the computing of scores comprises:
weighting the scores based on a reliability weighting of at least one database from which at least one record is returned.

9. The method as set forth in claim 7, further comprising:
extracting a logo image segment from the business card image; and
querying at least one image database respective to the logo image segment;
the global adjustment being further based on records returned by the querying of the at least one image database respective to the logo image segment.

10. A system for generating a textual contact record from a business card image, the system comprising:
a cellular telephone including a built-in camera configured to (i) acquire an image of a business card using the built-in camera and (ii) extract textual content candidates from the image of the business card by optical character recognition (OCR) and (iii) extract at least one logo image segment from the image of the business card;
a content candidates scoring processor that queries at least one database respective to the textual content candidates and collects records returned responsive to the queries and assigns scores to the textual content candidates based on the collected records, the content candidates scoring processor including a local scoring processor that assigns a score to each textual content candidate based on records returned by queries respective to the textual content candidate;
wherein the content candidates scoring processor also image queries at least one image database respective to the logo image segment and collects textual metadata returned responsive to the image query, the content candidates scoring processor further including a global adjuster that modifies the score of a selected textual content candidate when the collected textual metadata includes the selected textual content candidate; and
a content selector that selects a textual content candidate for each text image segment based at least on the assigned scores.

11. The system as set forth in claim 10, wherein the global adjuster modifies the score of a first textual content candidate that was extracted by OCR from a corresponding first text image segment when at least one record returned by a query respective to a second textual content candidate that was extracted by OCR from a second text image segment different from the first text image segment also includes the first textual content candidate.

12. The system as set forth in claim 10, wherein the at least one database queried by the database query includes a plurality of databases, and the content candidates scoring processor further comprises:
stored database weights corresponding to the databases, the scores assigned based on the collected records incorporating the database weights of the databases from which the records were collected.

13. The system as set forth in claim 12, wherein the content candidates scoring processor further comprises:
a database weights adjuster that adjusts the stored database weights based on ongoing accuracy of support for textual content candidates provided by the databases.

14. The system as set forth in claim 10, wherein the content candidates scoring processor further comprises:
a tagging adjuster that selectively adjusts tags assigned to the text image segments of the business card image based on the collected records.

15. The system as set forth in claim 10, wherein each textual content candidate has a confidence level assigned thereto by the OCR, and the content selector selects the textual content candidate for each text image segment based on the OCR-assigned confidence levels adjusted by the assigned scores.

* * * * *